Dec. 30, 1941.  D. CHURCHILL, JR  2,268,187
CATALYTIC CRACKING METHOD
Filed Jan. 26, 1939
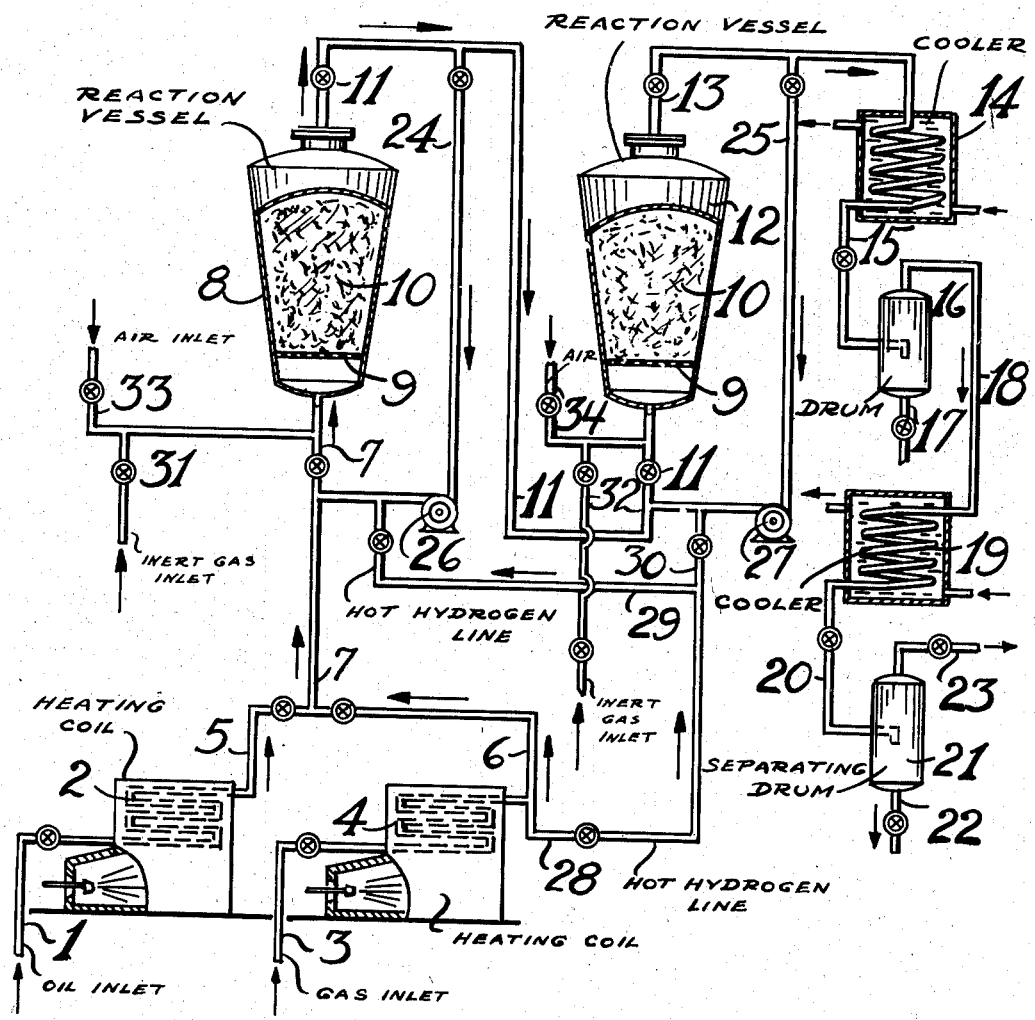

Patented Dec. 30, 1941

2,268,187

UNITED STATES PATENT OFFICE 2,268,187

CATALYTIC CRACKING METHOD

Durand Churchill, Jr., New York, N. Y., assignor to Standard Oil Development Company, a corporation of Delaware Application January 26, 1939, Serial No. 252,856

6 Claims. (Cl. 196—53)

This invention relates to the catalytic cracking of heavy hydrocarbon oils such as gas oils and the like in order to produce distillates of high octane number suitable for motor fuel.

The invention will be fully understood from the following description read with reference to the accompanying drawing which is a diagrammatic view in sectional elevation of one type of apparatus which may be used.

The cracking of heavy hydrocarbon oils has been known and practised for many years and there have been many attempts to apply catalysts to assist the reaction. Catalytic processes have been carried out successfully in commercial operation in the presence of hydrogen under high pressures of the order of 200 atmospheres. More recently certain catalytic cracking operations have been carried out at substantially atmospheric pressures in the absence of hydrogen. These latter processes have one distinct disadvantage. In the cracking reaction, highly unsaturated materials are inevitably formed and these materials rapidly polymerize to heavier constituents having a lower hydrogen content. These heavier constituents separate from the gaseous stream upon the catalyst and undergo further cracking and polymerization to such an extent that the activity of the catalyst is quickly reduced to a point at which further operation is uneconomical. If continued further, cokey solid residues are formed which may clog the entire reaction vessel.

In this type of operation the activity of the catalyst can be regenerated by treatment with steam, carbon dioxide or a mixture of the same with air. However, the length of the cracking cycle is so short and the length of the regenerating cycle is so long that such processes do not appear to be economical.

The present invention is concerned with an improved type of catalytic cracking process in which the above mentioned difficulties may be largely prevented or minimized. It has been found that by maintaining the catalyst mass in a more or less homogeneous condition and by breaking up any portions of it which tend to coke together, and further by carrying out the catalytic reaction in the presence of hydrogen under moderate pressures of the order of 100 to 300 pounds per square inch, the formation of coke on the catalyst is substantially retarded and such coke as does form is not concentrated at certain points in the catalyst mass.

According to the present invention, these results are obtained by causing a rapid vibratory motion of the granular catalyst at intervals during the cracking and regeneration. The rapid vibratory motion during the cracking cycle is brought about by injecting quantities of hot hydrogen or gases containing free hydrogen from time to time into the catalyst mass. Sufficient hydrogen is injected to increase the rate of flow of vapors through the catalyst mass to a point at which the vibratory motion of the catalyst is accomplished. By this it should be understood that the catalyst particles are not carried along with the gas but are merely shaken so as to give them the appearance of a boiling liquid. In this way it will be seen that the hydrogen performs both functions, namely, by its introduction into the catalyst mass it causes vibratory motion therein and by its presence in the reaction vessel during the reaction, it tends to prevent the formation of coke on the catalyst. The rapid vibratory motion during the regeneration cycle is brought about by the injection or recirculation of inert gases as will be explained more fully below.

It has been observed that the cracking and polymerization proceed at certain points on the catalyst mass more rapidly than at others with the result that at these points the catalyst tends to become clogged with the heavy polymer or coke. The clogging process is a cumulative one because the hydrocarbon vapors are now diverted away from the plugged section and, in consequence, this portion gradually grows until ultimately the reaction vessel is coked solid. Ordinarily operation would not be allowed to continue to this point because as the effective portion of the catalyst becomes continually smaller, the conversion per pass will of course diminish. For this reason the cracking or conversion cycle is necessarily of short duration.

For the same reason during the regeneration cycle, the regenerating gases channel through the portions of the catalyst mass which are not coked and the regeneration cycle is therefore much longer than it would be if the regenerating gases could be brought into contact more effectively with the cokey portions of the catalyst.

Referring to the drawing, the heavy hydrocarbon oil to be subjected to catalytic cracking is introduced through line 1 and passes through a heating means 2. Hydrogen or a gas containing free hydrogen is introduced under moderate pressure through line 3 and passes through a heating means 4. The heated oil and the heated hydrogen flow through lines 5 and 6 respectively and thence the mixture flows through line 7 into the bottom of reaction vessel 8 which is preferably conical in shape with the base at the top. The reaction vessel is provided with a grate or porous plate 9 near the bottom which supports a mass of catalytic particles 10. The products of reaction leave reaction vessel 8 through line 11 and thence flow into the bottom of another reaction vessel 12 similar in all respects to reaction vessel 8. From reaction vessel 12 the products leave through line 13 and flow through a cooling means 14 and thence through line 15 into a separating drum 16 in which the heavier liquid fractions are separated from the uncondensed fractions. The liquid fractions are removed from drum 16 through line 17. The uncondensed fractions are removed from drum 16 through line 18 and pass thence through a second cooling means 19 where further condensation occurs and thence through line 20 into a second separating drum 21 from which the liquid products are removed through line 22 and the gaseous products are removed through line 23.

The vibratory motion of the catalyst in reaction vessels 8 and 12 is accomplished by causing an increased flow of gas from time to time through the catalyst mass. This may be accomplished in a number of different ways such as by recycling a portion of the vapors which pass through the reaction vessels by means of lines 24 and 25 provided with blowers 26 and 27 respectively. On the other hand, increased flow of gas through the catalyst mass may be accomplished by increasing the oil feed rate from time to time. It is preferred, however, to cause this increase in flow of gas through the catalyst mass by introducing hot hydrogen from time to time into the reaction vessels 8 and 12. Hot hydrogen may be introduced into reaction vessel 8 through lines 28, 29 and 7, and into reaction vessel 12 through lines 28, 30 and 11. If desired, the increased flow of gas may be accomplished both by introducing hydrogen through lines 29 and 30 and by recycling a portion of the vapors in reaction vessels 8 and 12 through lines 24 and 25 respectively.

For the regeneration step, inert gas may be introduced into the bottom of reaction vessels 8 and 12 through lines 31 and 32 respectively. Air may be introduced in carefully regulated quantities by means of lines 33 and 34 respectively.

In the operation of the process the oil and hydrogen are heated to a temperature between about 750 and 1000° F. and then forced under pressure between 100 and 300 pounds per square inch through the reaction vessels at a rate between 0.3 and 2 volumes of oil per volume of reaction space per hour. Ordinarily this rate is insufficient to cause the necessary rapid vibratory motion of the catalyst mass. From time to time, hot hydrogen is injected into reaction vessels 8 and 12 through lines 29 and 30 respectively and in this way the flow of vapors is increased sufficiently to cause vibratory motion. After the catalyst mass is thoroughly homogenized, the introduction of hydrogen through lines 29 and 30 is stopped until required again. In some cases, when treating oils which have a greater tendency to polymerize than others, it has been found to be desirable to continue the injection of hot hydrogen during the major portion of the cracking cycle or even during the entire cracking cycle. This should be avoided wherever possible because the violent motion causes the lumps of catalyst to break up into smaller particles.

The reaction vessels are maintained under pressures between about 100 and 300 pounds per square inch, preferably between 200 and 300 pounds per square inch. Various types of catalysts may be used, for example the ordinary decolorizing clays or acid treated clays or synthetic clay-like mixtures obtained by reacting alumina, silica, magnesia and other oxides. The catalysts may be in the form of pills or other small sized lumps, preferably having an average diameter of about 4 to 10 millimeters. Oxides and sulfides of metals of the sixth group of the periodic system are effective when used alone but are particularly effective when used in admixture with calcium oxides, magnesia, alumina, silica and the like.

It will be understood that if the catalyst particles are large or the density is high, relatively higher velocities will be required to obtain the vibratory motion than in the case of smaller and less dense particles. With particles of about 4 millimeters diameter, it is found that a velocity of about 70 pounds per square foot of cross section per hour is usually sufficient to cause a good vibratory motion.

The regenerating cycle immediately follows the cracking cycle and it is found that the catalyst may be brought back substantially to its initial activity. The temperatures during regeneration should not be allowed to go much above 1200° F. and the temperature may be controlled by regulating the quantity of oxygen which is introduced with the regenerating gases. Ordinarily, inert gases such as flue gas, superheated steam, or nitrogen containing between 4 and 10% of oxygen are suitable for regenerating purposes. As in the cracking cycle it is ordinarily only necessary to produce a vibratory motion in the catalyst mass for short intervals, but this vibratory motion may be maintained throughout the entire regeneration cycle, if desirable. It will be understood that the vibratory motion in the regeneration cycle is not accomplished by injection of hydrogen but rather by recirculation of the regenerating gases through lines 24 and 25.

The quantity of hydrogen used in the present process should be sufficient to retard substantially the formation of heavy polymers or coke on the catalyst but insufficient to cause appreciable hydrogenation or saturation of the desired cracked product. In general, quantities of hydrogen between about 2000 and 4000 cubic feet per barrel are suitable. It will be understood that the quantity of hydrogen introduced with the hot oil and the quantity of hydrogen injected to cause the vibratory motion of the catalyst mass in the reaction vessel must be regulated so that the total quantity of hydrogen present in the reaction vessel is maintained more or less within these limits. It can be seen that in certain cases where the vibratory motion of the catalyst mass must be continued throughout the cracking cycle, most, if not all, of the hydrogen may be introduced through lines 29 and 30. Similarly, if it is found that the quantity of hydrogen that must be introduced to accomplish the necessary vibratory motion of the catalyst mass is greater than about 4000 cubic feet per barrel of oil, the required vibratory motion may be accomplished partly by the introduction of hydrogen and partly by one or more other methods such as recirculating some of the vapors in the reaction vessel through lines 24 and 25 or by increasing the oil feed rate.

The present process may be utilized on all types of distillate feed stocks which can be vaporized. It may be applied to heavy naphtha, kerosene and gas oil and may be operated in conjunction with an ordinary cracking process. The process may also be applied to heavy hydrocarbon oils obtained by the destructive distillation or destructive hydrogenation of coals, tars, mineral oils, shales, peats, lignites, bitumens, etc., or oils obtained by synthetic processes such as the Fischer synthesis.

This invention is not limited by any theories of the mechanism of the reactions nor by any details which have been given merely for purposes of illustration, but is limited only in and by the following claims in which it is my intention to claim all novelty inherent in the invention.

I claim:

1. An improved process for catalytically cracking heavy hydrocarbon oil to produce lower boiling hydrocarbons of high octane number suitable for motor fuel which comprises heating the oil to a temperature between 750 and 1000° F. under a pressure between 100 and 300 pounds per square inch, separately heating a gas rich in free hydrogen to substantially the same temperature and under substantially the same pressure, introducing the heated oil and hydrogen into the bottom portion of a reaction vessel containing a bed of granular catalyst, from time to time injecting into the bottom portion of the catalyst bed a quantity of hot hydrogen sufficient to cause vibratory motion of the catalyst particles in the bed, removing the products from the reaction vessel and recovering a fraction boiling in the motor fuel range therefrom.

2. Process according to claim 1 in which the total quantity of hydrogen introduced into the reaction zone is maintained between the limits of about 2000 and 4000 cubic feet per barrel of oil.

3. In a process for catalytically cracking heavy hydrocarbon oil to produce lower boiling hydrocarbons of high octane number suitable for motor fuel in which the heavy hydrocarbon oil is contacted in a reaction zone with a granular catalyst, the improvements which comprise carrying out the reaction at a temperature between 750 and 1000° F., under pressure between 100 and 300 pounds per square inch and in the presence of hydrogen and maintaining the contact mass in substantially homogeneous condition by periodically injecting hot hydrogen upwardly into the reaction zone in quantities sufficient to cause vibratory motion of the catalyst particles therein, the total quantity of hydrogen present in the reaction zone being regulated between about 2000 and 4000 cubic feet per barrel of oil.

4. An improved process for catalytically cracking heavy hydrocarbon oil to produce lower boiling hydrocarbons of high octane number suitable for motor fuel which comprises carrying out the reaction at temperatures between 750 and 1000° F. under pressures between 100 and 300 pounds per square inch and in the presence of quantities of hydrogen between 2000 and 4000 cubic feet per barrel of oil, at least the major proportion of which hydrogen is introduced upwardly into the reaction zone from time to time in quantities sufficient to cause vibratory motion of the catalyst within the reaction zone, removing the products of reaction and recovering a fraction boiling in the motor fuel range therefrom.

5. An improved process for catalytically cracking heavy hydrocarbon oil to produce lower boiling hydrocarbons of high octane number suitable for motor fuel which comprises carrying out the catalytic reaction in a reaction zone containing a bed of granular catalyst at a temperature between 750 and 1000° F., under pressures between 100 and 300 pounds per square inch and in the presence of quantities of hydrogen sufficient to retard coke formation on the catalyst but insufficient to cause appreciable hydrogenation of the desired low boiling hydrocarbons, the said hydrogen being introduced upwardly into the reaction zone from time to time in quantities sufficient to cause a vibratory motion of the catalyst mass in the reaction zone, removing the products of reaction and recovering a fraction boiling in the motor fuel range therefrom.

6. Process according to claim 5 in which the total quantity of hydrogen introduced into the reaction zone is between about 2000 and 4000 cubic feet per barrel of oil.

DURAND CHURCHILL, Jr.